(12) United States Patent
Lin et al.

(10) Patent No.: US 12,474,758 B2
(45) Date of Patent: Nov. 18, 2025

(54) ACTIVE STATE POWER MANAGEMENT CONTROLS

(71) Applicant: Hewlett-Packard Development Company, L.P., Spring, TX (US)

(72) Inventors: Wen-Bin Lin, Taipei (TW); Chao-Wen Cheng, Taipei (TW); Chien-Cheng Su, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 80 days.

(21) Appl. No.: 18/691,734

(22) PCT Filed: Oct. 13, 2021

(86) PCT No.: PCT/US2021/054665
§ 371 (c)(1),
(2) Date: Mar. 13, 2024

(87) PCT Pub. No.: WO2023/063936
PCT Pub. Date: Apr. 20, 2023

(65) Prior Publication Data
US 2024/0385672 A1 Nov. 21, 2024

(51) Int. Cl.
*G06F 1/3215* (2019.01)
*G06F 1/3234* (2019.01)
(Continued)

(52) U.S. Cl.
CPC .......... *G06F 1/3215* (2013.01); *G06F 1/3253* (2013.01); *G06F 11/2247* (2013.01);
(Continued)

(58) Field of Classification Search
CPC ...... G06F 1/3215; G06F 1/325; G06F 1/3253; G06F 11/2247; G06F 11/3055;
(Continued)

(56) References Cited

U.S. PATENT DOCUMENTS 5,781,744 A 7/1998 Johnson et al.
7,752,473 B1 * 7/2010 Kwa ..................... G06F 1/3215
713/323

(Continued)

OTHER PUBLICATIONS

"ASPM Optionality". PCI-SIG Engineering Change Notice. Aug. 20, 2009. Hewlett-Packard et al. (Year: 2009).*
(Continued)

*Primary Examiner* — Thomas J. Cleary
(74) *Attorney, Agent, or Firm* — Quarles & Brady LLP

(57) ABSTRACT

In example implementations, an apparatus is provided. The apparatus includes an expansion slot, a peripheral device connected to the expansion slot, and a processor communicatively coupled to the expansion slot. The processor is to determine that a compatibility of the peripheral device with active state power management (ASPM) is unknown, provide a notification to indicate that the compatibility of the peripheral device with ASPM is unknown, wherein the notification provides a selection between disabling ASPM for the peripheral device or enabling ASPM for the peripheral device, and configure a basic input/output system (BIOS) setting in accordance with the selection to control the ASPM for the peripheral device.

15 Claims, 5 Drawing Sheets

(51) Int. Cl.
*G06F 11/22* (2006.01)
*G06F 11/32* (2006.01)
*G06F 13/42* (2006.01)

(52) U.S. Cl.
CPC ........ *G06F 11/327* (2013.01); *G06F 13/4282* (2013.01); *G06F 2213/0026* (2013.01); *Y02D 10/00* (2018.01)

(58) Field of Classification Search
CPC .... G06F 11/324; G06F 11/327; G06F 11/328; G06F 13/4282; G06F 2213/0026; Y02D 10/00
See application file for complete search history.

(56) References Cited

U.S. PATENT DOCUMENTS

| | | | | |
|---|---|---|---|---|
| 2006/0277344 | A1* | 12/2006 | Yasui | G06F 1/3203 710/305 |
| 2007/0028080 | A1* | 2/2007 | Hobson | G06F 13/385 713/1 |
| 2009/0158069 | A1* | 6/2009 | Oh | G06F 1/3203 713/323 |
| 2011/0087913 | A1 | 4/2011 | Robles et al. | |
| 2016/0179744 | A1 | 6/2016 | Chu | |
| 2016/0182539 | A1 | 6/2016 | Edwards et al. | |
| 2023/0324978 | A1* | 10/2023 | Chang | G06F 1/325 713/320 |
| 2025/0216998 | A1* | 7/2025 | Liu | G06F 3/0484 |

OTHER PUBLICATIONS

Corbet, Jonathan. "PCIe, power management, and problematic BIOSes". LWN. Online Jun. 29, 2011. Retrieved from Internet Aug. 21, 2025. <https://lwn.net/Articles/449448/>. (Year: 2011).*

Corbet, Jonathan. "Matthew Garrett responds to the ASPM power regression". LWN. Online Jun. 29, 2011. Retrieved from Internet Aug. 21, 2025. <https://lwn.net/Articles/449648/>. (Year: 2011).*

Pandya, Parthiv, et al. "Low Power Sub-States of LAN743x". AN2949. 2019. Microchip Technology Inc. (Year: 2019).*

* cited by examiner

ACTIVE STATE POWER MANAGEMENT CONTROLS

BACKGROUND

Computing devices can be used to execute various applications and programs. A processor is deployed in a computing device to execute the applications and programs. The computing device can have additional processors (e.g., graphical processors) that also execute applications and programs.

The computing device may also include a peripheral component interconnect express (PCIe) interface. The PCIe interface may include slots that allow different peripheral devices to be connected to the computing device.

DETAILED DESCRIPTION

Examples described herein provide an apparatus and method to control active state power management for a peripheral device. As discussed above, a computing device may include a peripheral component interconnect express (PCIe) interface. The PCIe interface may include slots that allow different peripheral devices to be connected to the computing device.

Some peripheral devices connected to the PCIe interface may be compatible with active state power management (ASPM). ASPM saves power in the PCIe interface by setting a lower power state for PCIe links when the peripheral devices connected to the PCIe interface are not in use. ASPM controls the power state at both ends of the connection. When ASPM is enabled, device latency may increase because of the time required to transition the connection between the different power states.

ASPM may have three policies to determine power states. A first policy may be a default policy that sets the PCIe link power states according to the defaults specified by the firmware on the system (e.g., the basic input/output system (BIOS)). A second policy may be a powersave policy that sets ASPM to save power wherever possible, regardless of the cost of performance. A third policy may be a performance policy that disables ASPM to allow the PCIe interface to operate with maximum performance.

ASPM may provide power savings. However, some peripheral devices may not be compatible with ASPM. Thus, when a peripheral device is connected to the PCIe interface that is not compatible with ASPM and ASPM is applied, the peripheral device may become unstable or malfunction.

A user may not know whether a peripheral device is ASPM compatible when connected to the PCIe interface. Moreover, the user may not know how to configure a BIOS to turn ASPM on and off for the PCIe interface.

The present disclosure provides an apparatus and method that can detect whether the ASPM compatibility for a connected peripheral device is known. If the ASPM compatibility for a connected peripheral device is unknown, the present disclosure may notify the user and allow a user to control the ASPM for the connected peripheral device.

Figure 1:
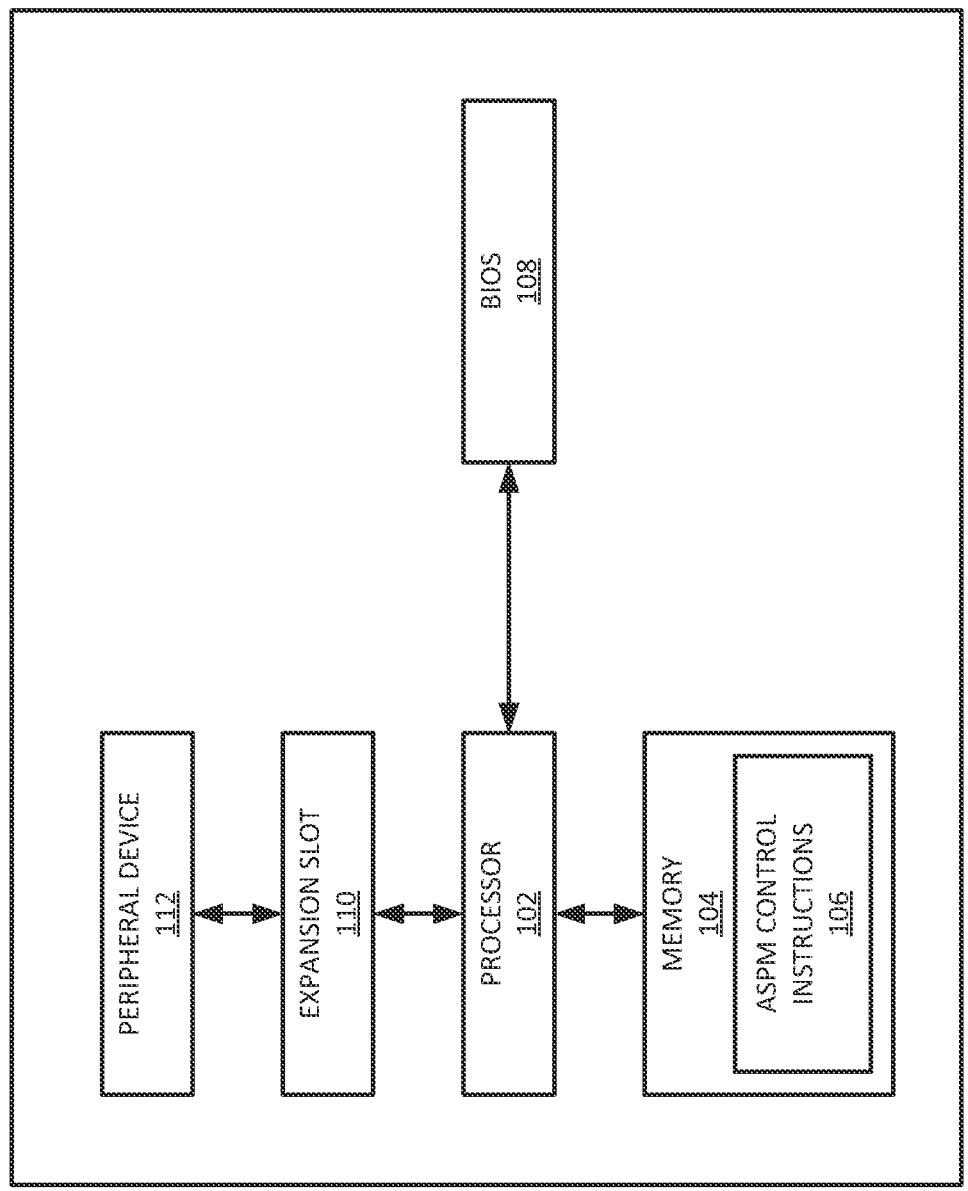
FIG. 1 is a block diagram of an example an apparatus of the present disclosure of the present disclosure.

FIG. 1 illustrates an example apparatus 100 of the present disclosure. In an example, the apparatus 100 may be a computing device or computing system. For example, the apparatus 100 may be a desktop computer, a laptop computer, a tablet computer, or the like.

It should be noted that apparatus 100 has been simplified for ease of explanation. Although various example components are illustrated in FIG. 1, it should be noted that the apparatus 100 may include additional components that are not shown. For example, the apparatus 100 may include input/output devices (e.g., a display, a monitor, a keyboard, a mouse, a trackpad, and the like), a power supply, various interfaces (e.g., a universal serial bus (USB) interface), communications interfaces (e.g., a wired or wireless communication interface such as WiFi, Ethernet, and the like), and so forth.

In an example, the apparatus 100 may include a processor 102, a memory 104, a basic input/output system (BIOS) 108, an expansion slot 110, and a peripheral device 112. The processor 102 may be communicatively coupled to the memory 104, the BIOS 108, and the expansion slot 110. The processor 102 may make configuration changes to the BIOS 108 and control operation of the peripheral device 112 via the expansion slot 110.

As used herein, a BIOS refers to hardware or hardware and instructions to initialize, control, or operate a computing device prior to execution of an operating system (OS) of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the OS of a computing device. A BIOS may initialize, control, or operate components such as hardware components of a computing device and may load or boot the OS of the computing device.

In some examples, a BIOS may provide or establish an interface between hardware devices or platform firmware of the computing device and an OS of the computing device, via which the OS of the computing device may control or operate hardware devices or platform firmware of the computing device. In some examples, a BIOS may implement the Unified Extensible Firmware Interface (UEFI) specification or another specification or standard for initializing, controlling, or operating a computing device.

In an example, the expansion slot 110 may be an interface that allows additional peripheral devices 112 to be connected to the apparatus 100. For example, the expansion slot 110 may be a peripheral component interconnect express (PCIe) interface that includes PCIe slots and M.2 slots to connect additional peripheral devices 112.

The peripheral device 112 may be any type of device that can be connected to the expansion slot 110. Although a single peripheral device 112 is illustrated in FIG. 1, it should be noted that any number of peripheral devices up to a number of available slots in the expansion slot 110 may be connected. The peripheral device 112 may be a discrete graphics card, a network interface card, a memory card (e.g., a solid state non-volatile memory express (NVMe) card), and the like.

As noted above, some peripheral devices 112 may be compatible with ASPM. ASPM saves power consumption by the expansion slot 110 by setting a lower power state for the slots connected to peripheral devices 112. However, some peripheral devices may not be compatible with ASPM. For example, ASPM controls for non-compatible peripheral devices may cause failure or malfunctions when the slot connected to the non-compatible peripheral device is set to a power save mode.

However, in some instances, whether a peripheral device 112 is compatible with ASPM controls may be unknown. Thus, the present disclosure provides the ability to identify when the ASPM compatibility for a peripheral device 112 is unknown and to allow a user to select whether to enable or disable ASPM controls. If it is discovered that the peripheral device 112 is compatible with ASPM through forced enabling by the user, the peripheral device 112 can be added to the white list of approved devices.

In an example, ASPM control instructions 106 may be stored in the memory 104 and executed by the processor 102 to perform the functions described herein. The memory 104 may be any type of non-transitory computer readable storage medium. The memory 104 may be a random access memory (RAM), a hard disk drive, a solid state drive, a read-only memory (ROM), or the like.

The memory 104 may store instructions that are executed by the processor 102. As noted above, the memory 104 may store the ASPM control instructions 106. The ASPM control instructions 106 may cause the processor to determine that a compatibility of the peripheral device 112 with ASPM is unknown and to provide a notification to indicate that the compatibility of the peripheral device 112 with ASPM is unknown. The notification may provide a selection between disabling ASPM for the peripheral device 112 or enabling ASPM for the peripheral device 112. In response to the selection, the ASPM control instructions 106 may cause the processor 102 to configure a setting in the BIOS 108 in accordance with the selection to control the ASPM for the peripheral device 112. Further details of the ASPM control instructions 106 are described in further details below.

In an example, the memory 104 may store other information. For example, the memory 104 may store a white list and a black list. The white list may include a list of known peripheral devices 112 that are compatible with ASPM. The black list may include a list of known peripheral devices 112 that are not compatible or are incompatible with ASPM. Further details regarding the white list and the black list and how they are used to identify peripheral devices 112 with unknown ASPM compatibility are discussed in further detail below.

Figure 2:
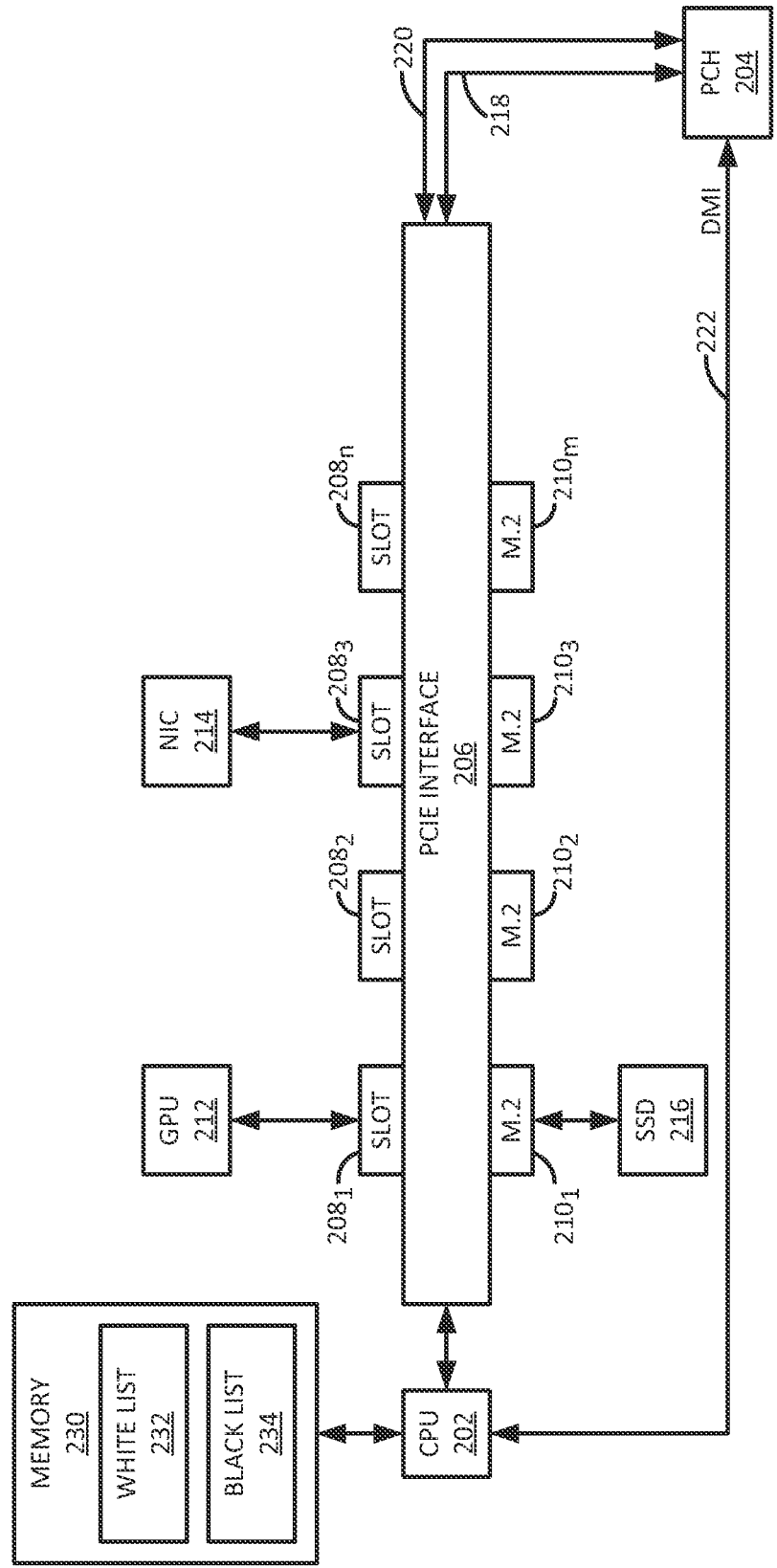
FIG. 2 is a block diagram of the example apparatus that includes a peripheral component interconnect express (PCIe) interface of the present disclosure.

FIG. 2 illustrates a block diagram of an apparatus 200. The apparatus 200 may be similar to the apparatus 100. For example, the apparatus 200 may be a computing device or computing system. For example, the apparatus 200 may be a desktop computer, a laptop computer, a tablet computer, or the like.

It should be noted that apparatus 200 has been simplified for ease of explanation. Although various example components are illustrated in FIG. 2, it should be noted that the apparatus 200 may include additional components that are not shown. For example, the apparatus 200 may include input/output devices (e.g., a display, a monitor, a keyboard, a mouse, a trackpad, and the like), a power supply, various interfaces (e.g., a universal serial bus (USB) interface), communications interfaces (e.g., a wired or wireless communication interface such as WiFi, Ethernet, and the like), and so forth.

FIG. 2 illustrates an example where the expansion slot 110 in FIG. 1 is a PCIe interface 206. In an example, the apparatus 200 may include a central processing unit (CPU) 202, a platform controller hub (PCH) 204, a memory 230, and the PCIe interface 206. The CPU 202 may be similar to the processor 102. The PCH 204 may be communicatively coupled to the PCIe interface 206 via channels 218 and 220. The channels 218 and 220 may be part of the system management bus (SMBus) of the PCIe interface 206.

In an example, the PCIe interface 206 may include a plurality of slots $208_1$ to $208_n$ (hereinafter also referred to individually as a slot 208 or collectively as slots 208) and a plurality of M.2 slots $210_1$ to $210_m$ (hereinafter also referred to individually as an M.2 slot 210 or collectively as M.2 slots 210). There may be an equal number of slots 208 and M.2 slots 210, or there may be a different number of slots 208 and M.2 slots 210. The slots 208 may be PCIe slots that are compatible with various discrete graphics cards and network interface cards. The M.2 slots 210 may be compatible with various NVMe solid state memory cards.

In an example, a graphical processing unit (GPU) card 212 may be connected to slot $208_1$, a network interface card (NIC) 214 may be connected to slot $208_3$, and an NVMe solid state drive (SSD) 216 may be connected to the M.2 slot $210_1$. In an example, the GPU 212 may be ASPM compatible, the ASPM compatibility of the NIC 214 may be unknown, and the SSD 216 may be known to be incompatible with ASPM controls.

In an example, the device information as well as other types of information may be transmitted or received via the channels 218 and 220 of the SMBus. In an example, one of the channels 218 or 220 may provide signals indicating which slots 208 and which M.2 slots 210 are connected to a peripheral device, and another one of the channels 218 or 220 may provide configuration and device information to the PCH 204. For example, the channel 218 may provide a connection signal, and the channel 220 may provide configuration and device information.

In an example, the PCH 204 may communicate with the CPU 202 via a direct media interface (DMI) channel 222. The PCH 204 may provide the configuration and device information to the CPU 202 to allow the CPU 202 to perform ASPM controls for the connected peripheral devices. For example, the CPU 202 may also be connected to a memory 230 that stores the ASPM control instructions 106 illustrated in FIG. 1, and discussed above.

In an example, when the apparatus 200 is booted up, the PCH 204 may scan the PCIe interface 206 for any devices that are connected to the slots 208, or the CPU 202 may scan the PCIe interface 206 for any devices that are connected the M.2 slots 210. The PCH 204 may receive a connection signal via the channel 218. The PCH 204 may then receive configuration information and device information (e.g., a device name, a model number, a version number of the firmware on the device, and the like). The PCH 204 may forward the device information and the respective slot 208 or M.2 slot 210 connected to the device to the CPU 202 via the DMI 222.

The CPU 202 may then check the device information against a white list 232 and/or a black list 234 stored in the memory 230. The white list 232 may be a predefined list of peripheral devices that are known to be compatible with ASPM controls. The black list 234 may be a predefined list of peripheral devices that are known to be incompatible with ASPM controls.

In the example described above, the GPU 212 may be ASPM compatible, the NIC 214 may have an unknown compatibility, and the SSD 216 may be known to be incompatible with ASPM. Thus, the GPU 212 may be listed in the white list 232. When the CPU 202 compares the device information of the GPU 212 with the white list 232, a match may be found. As a result, the CPU 202 may adjust an ASPM setting in the BIOS 108 for the GPU 212 to "on" or toggle to allow a power save mode when the GPU 212 is not in use or idle.

With respect to the SSD 216, the SSD 216 may be listed in the black list 234. Thus, when the CPU 202 compares the device information of the SSD 216 with the black list 234, a match may be found. As a result, the CPU 202 may adjust the ASPM setting in the BIOS 108 for the SSD 216 to "off" or toggle to disable a power save mode when the SSD 216 is not in use or idle.

With respect to the NIC 214, the NIC 214 may not be found on either the white list 232 or the black list 234. For example, the NIC 214 may be a new model that has not been tested yet for ASPM compatibility or may be an unknown off label NIC that has not been tested for ASPM compatibility. For whatever reason, the ASPM compatibility for the NIC 214 may be unknown.

In response, a warning message or notification (e.g., a pop-up warning message) may be generated and shown to the user via a display or monitor connected to the apparatus 200. The warning message may be provided during a boot up sequence before the operating system is launched. The warning message may indicate that the ASPM compatibility for the NIC 214 is unknown, or that ASPM controls may create instability with the NIC 214.

The notification may also provide an option to a user to select whether ASPM controls should be applied to the NIC 214. For example, the user may be allowed to select an option to enable the ASPM for the NIC 214 or to disable the ASPM control for the NIC 214. The notification may have a default suggestion to disable the ASPM control for devices with unknown compatibility.

In response to the user selection, the CPU 202 may adjust the ASPM setting in the BIOS 108 in accordance with the user's selection for the NIC 214. For example, if the user selects an option to force enable ASPM controls, the CPU 202 may adjust the ASPM setting in the BIOS 108 for the NIC 214 to "on." If the user selects an option to disable the ASPM controls, the CPU 202 may adjust the ASPM setting in the BIOS 108 for the NIC 214 to "off." The apparatus 200 may be rebooted with the appropriated ASPM settings in the BIOS 108, and the operating system may be launched.

In an example, if the user selects an option to force enable the ASPM controls for the NIC 214, the operation of the NIC 214 may be monitored over a period of time (e.g., several days, several weeks, several months, and the like). If the NIC 214 operates or functions properly, the NIC 214 may be added to the white list 232. If the NIC 214 malfunctions or fails to operate, the NIC 214 may be added to the black list 234. The updated white list 232 or updated black list 234 may be transmitted to the manufacturer of the apparatus 200 to allow the manufacturer to then update all white lists 232 or black lists 234 to include the NIC 214. Thus, the white list 232 and the black list 234 can be updated to properly identify the NIC 214 as ASPM compatible or incompatible when the NIC 214 is subsequently used in another computing system.

Figure 3:
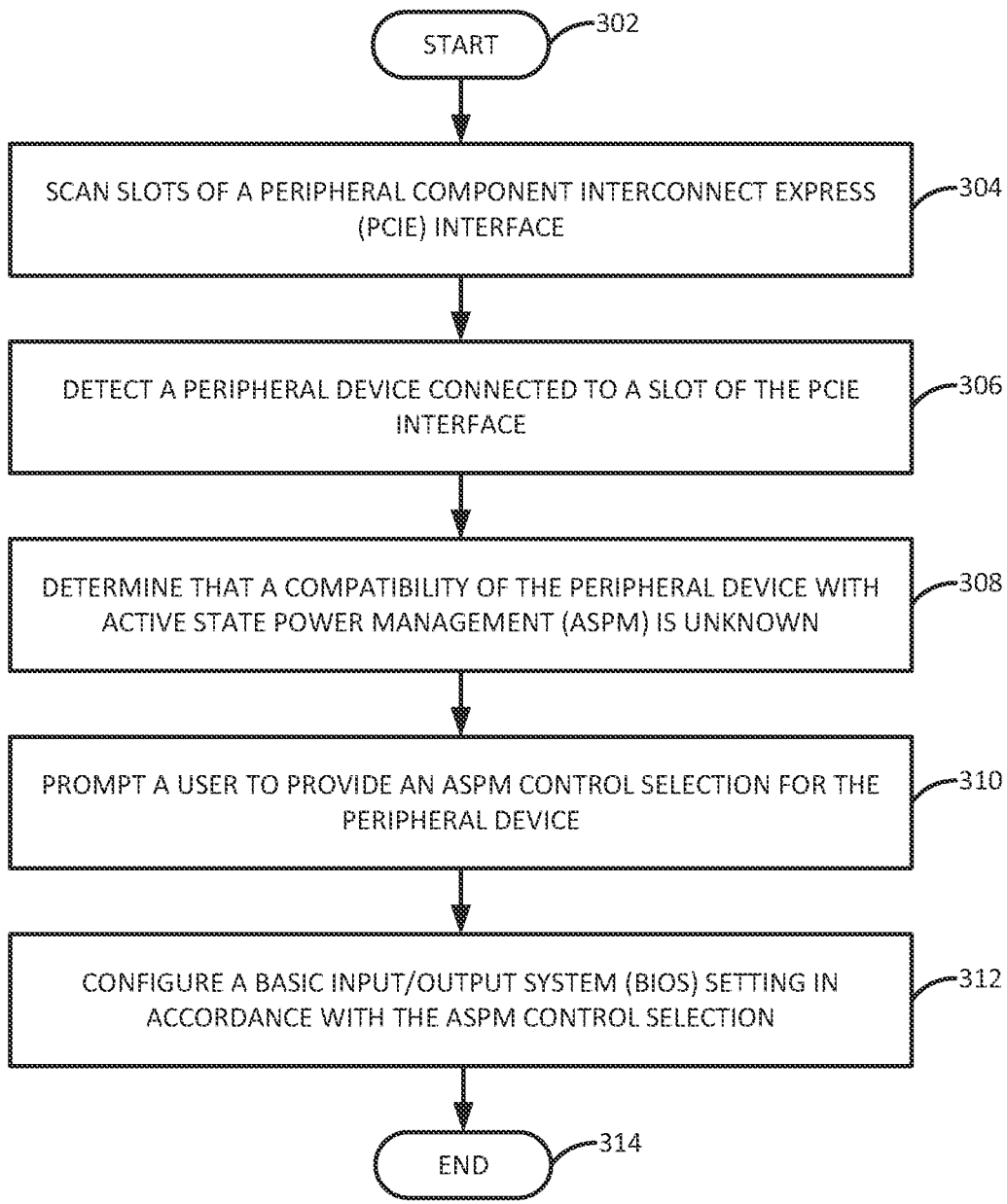
FIG. 3 is a flow chart of an example method to control active state power management for a peripheral device of the present disclosure.

FIG. 3 illustrates a flow diagram of an example method 300 for controlling active state power management for a peripheral device of the present disclosure. In an example, the method 300 may be performed by the apparatus 100 in FIG. 1, the apparatus 200 in FIG. 2, or the apparatus 500 illustrated in FIG. 5 and described below.

At block 302, the method 300 begins. At block 304, the method 300 scans slots of a peripheral component interconnect express (PCIe) interface. For example, as part of the boot sequence, the PCH or the CPU may scan the PCIe interface to determine if any peripheral devices are connected to any of the slots on the PCIe interface.

At block 306, the method 300 detects a peripheral device connected to a slot of the PCIe interface. For example, a discrete graphics card, a network interface card, a solid state drive, or the like, may be connected to a slot on the PCIe interface.

At block 308, the method 300 determines that a compatibility of the peripheral device with active state power management (ASPM) is unknown. For example, the device information of the peripheral device may be received over the SMBus of the PCIe interface. The device information may be provided to a processor or CPU that uses a look up table or list to determine if the device information is found in the look up table or list.

In an example, a white list may be used to identify peripheral devices that are known to be ASPM compatible. In an example, a black list may be used to identify peripheral devices that are known to be ASPM incompatible. If the device information is not found in either the white list or the black list (said another way the device information is missing from the white list and the black list), then the ASPM compatibility for the peripheral device may be unknown.

At block 310, the method 300 prompts a user to provide an ASPM control selection for the peripheral device. For example, a warning message or notification may be presented to the user. The message may include a prompt to enter a selection with respect to how the user wishes to proceed with ASPM controls for the peripheral device. The user may select an option to either force enable ASPM controls or disable ASPM controls.

At block 312, the method 300 configures a basic input/output system (BIOS) setting in accordance with the ASPM control selection. For example, a setting for ASPM controls of the peripheral device may be toggled in accordance with the ASPM control selection. The computing system may be rebooted then to launch the operating system. At block 314, the method 300 ends.

Figure 4:
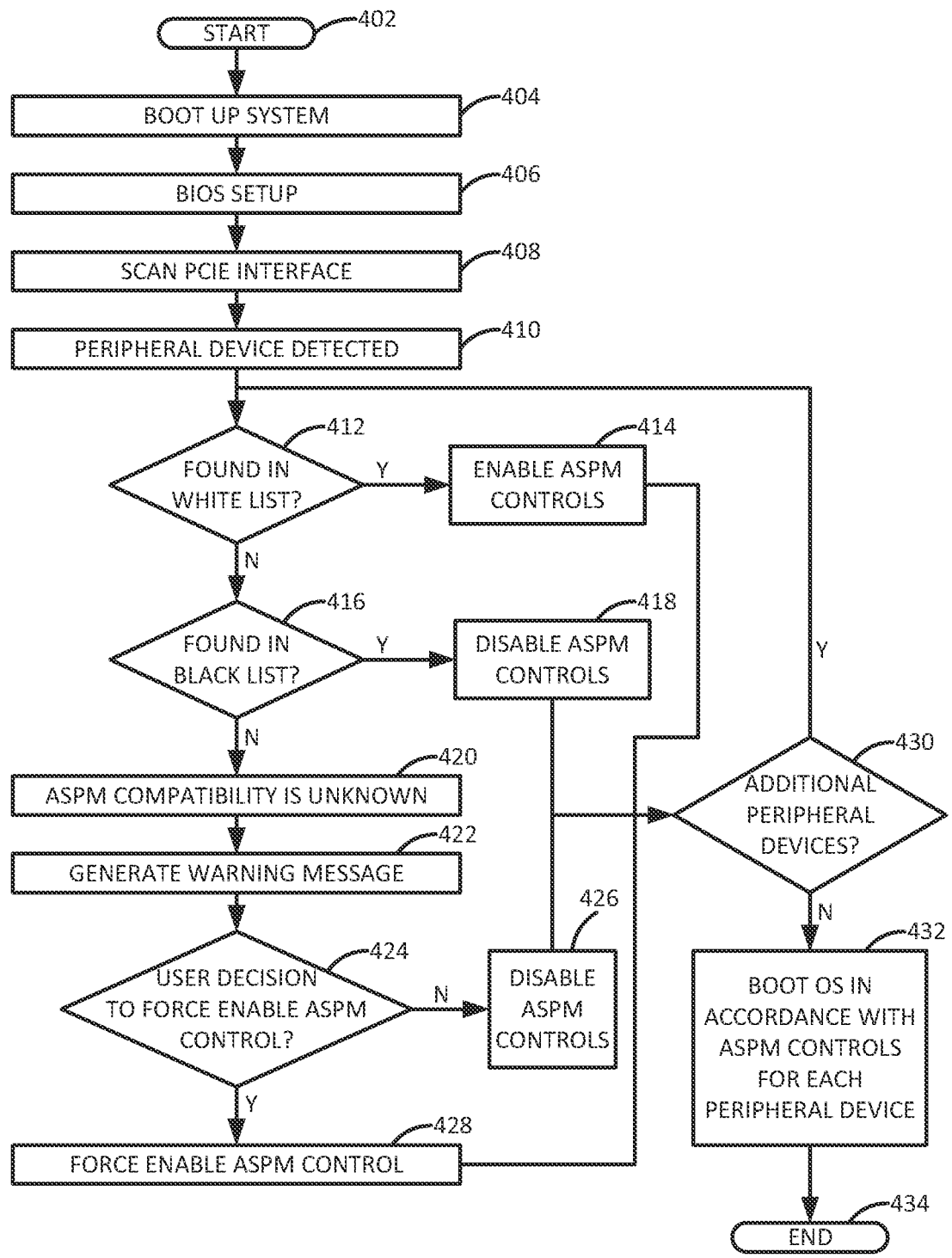
FIG. 4 is a flow chart of another example method to control active state power management for a peripheral device of the present disclosure.

FIG. 4 illustrates a flow diagram of an example method 400 for dynamically adjusting settings of a remote access application based on environmental workloads of the present disclosure. In an example, the method 400 may be performed by the apparatus 100 illustrated in FIG. 1, the apparatus 200 illustrated in FIG. 2, or the apparatus 500 illustrated in FIG. 5 and described below.

At block 402, the method 400 begins. At block 404, the method 400 initiates a sequence to boot up the system. At block 406, the method 400 may execute a BIOS setup. Part of the BIOS setup may be scan the PCIe slots to detect connected peripheral devices and determine the ASPM compatibility of the peripheral devices such that the ASPM settings for the peripheral devices can be set correctly.

At block 408, the method 400 scans the PCIe interface. As described above, the PCH or CPU may scan the PCIe interface and receive connection information and device information via the channels of the SMBus.

At block 410, the method 400 detects connected peripheral devices. Any number of peripheral devices may be connected. The device information associated with each connected peripheral device may be provided to the CPU to be compared against a white list and a black list. If the device information is not found in either the white list or the black list, then the peripheral device may be identified as having an unknown ASPM compatibility.

At block 412, the method 400 determines if the device information for the peripheral device is found in the white list. If the device information is found in the white list, then the peripheral device is ASPM compatible and the method 400 proceeds to block 414, where the ASPM controls for the peripheral device are enabled. If the device information is not found in the white list, then the method 400 proceeds to block 416.

At block 416, the method 400 determines if the device information for the peripheral device is found in the black list. If the device information is found in the black list, then the peripheral device is ASPM incompatible, and the method 400 proceeds to block 418, where the ASPM controls for the peripheral device are disabled. If the device information is not found in the black list, then the method 400 proceeds to block 420.

At block 420, the method 400 determines that the ASPM compatibility is unknown for the peripheral device. In response, at block 422 a warning message may be generated. The warning message may notify a user that the ASPM compatibility of a detected peripheral device is unknown. The message may prompt the user for a decision as to whether to enable or disable ASPM controls for the peripheral device.

At block 424, the method 400 determines whether the user wants to force enable the ASPM control. If the user decides to disable the ASPM control (e.g., the answer to block 424 is no), then the method 400 proceeds to block 426, where the ASPM control is disabled. If the user decides to force enable the ASPM control (e.g., the answer to block 424 is yes), then the method 400 proceeds to block 428 where the ASPM control is force enabled.

From either block 414, 418, 426, or 428, the method 400 proceeds to block 430. At block 430, the method 400 determines if any additional peripheral devices remain to be analyzed for ASPM compatibility. If the answer is yes, then the method 400 returns to the beginning of block 412 for the next detected peripheral device. If the answer is no, then the method 400 proceeds to block 432.

At block 432, the method 400 boots the operating system (OS) in accordance with the ASPM controls for each peripheral device. For example, the settings for the ASPM control for each peripheral device may be correctly set in the BIOS. The computing system may be restarted with the correct ASPM control settings in the BIOS, and the system may boot the OS. At block 434, the method 400 ends.

Figure 5:
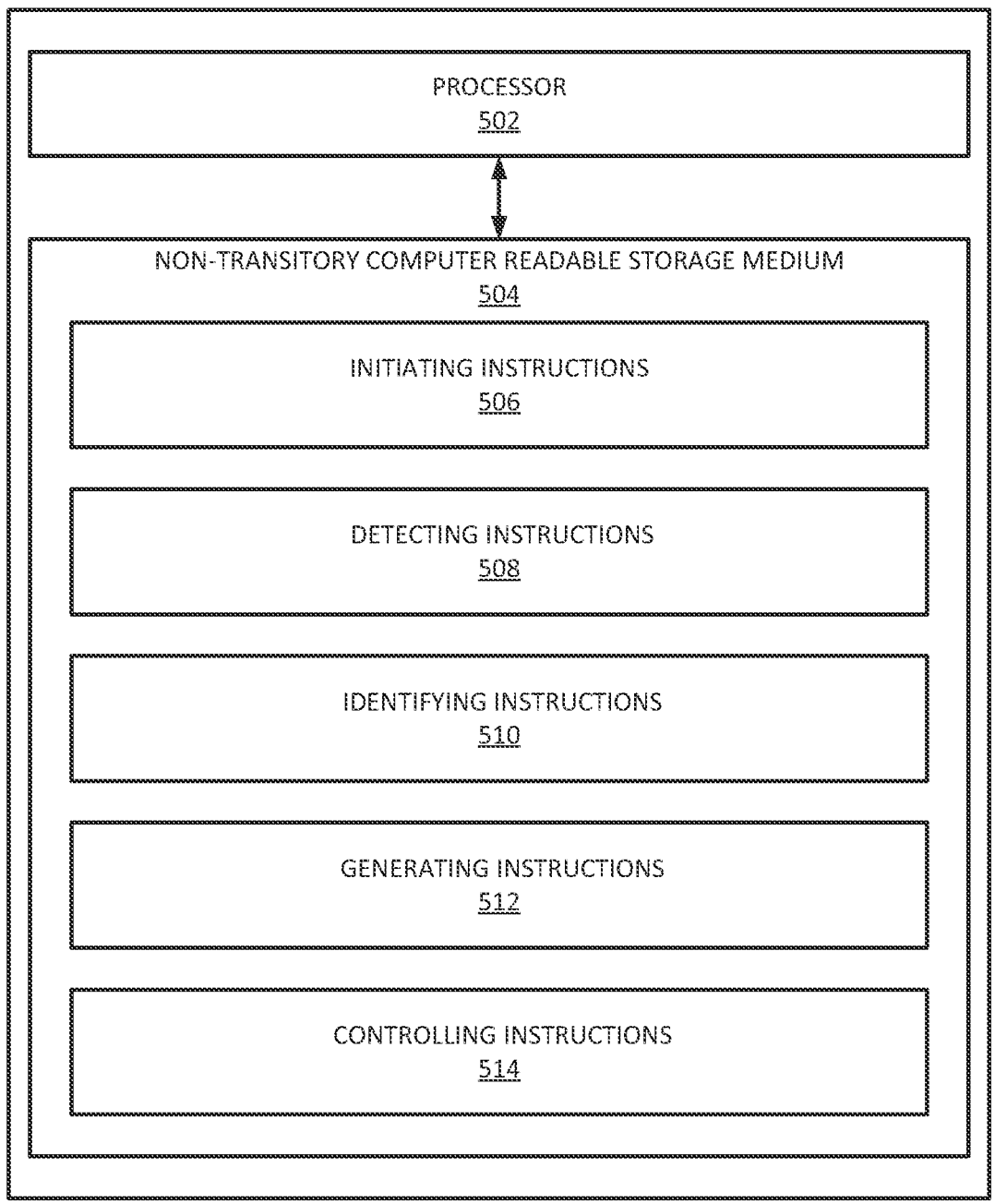
FIG. 5 is an example non-transitory computer readable storage medium storing instructions executed by a processor to control active state power management for a peripheral device of the present disclosure.

FIG. 5 illustrates an example of an apparatus 500. In an example, the apparatus 500 may be the apparatus 100 or 200. In an example, the apparatus 500 may include a processor 502 and a non-transitory computer readable storage medium 504. The non-transitory computer readable storage medium 504 may include instructions 506, 508, 510, 512, and 514 that, when executed by the processor 502, cause the processor 502 to perform various functions.

In an example, the instructions 506 may include initiating instructions. For example, the instructions 506 may initiate a boot sequence to boot up a computing system.

The instructions 508 may include detecting instructions. For example, the instructions 508 may detect peripheral devices connected to slots of a PCIe interface.

The instructions 510 may include identifying instructions. For example, the instructions 510 may identify a peripheral device of the peripheral devices that are connected that has an unknown compatibility with active state power management (ASPM). For example, the peripheral device may be identified based on a white list of approved ASPM devices and a black list of non-approved ASPM devices. If the peripheral device is not found on either list, then the ASPM compatibility for the peripheral device may be unknown.

The instructions 512 may include generating instructions. For example, the instructions 512 may generate a notification to be displayed to warn a user of the unknown compatibility of the identified peripheral device with ASPM. The notification may prompt a user for an ASPM control selection for the peripheral device. For example, the notification may suggest that the ASPM controls be disabled, but allow the user to force enable ASPM controls for the peripheral device.

The instructions 514 may include controlling instructions. For example, the instructions 514 may control the identified peripheral device in accordance with the ASPM control selection that is received. In an example, the computing system may be rebooted and the operating system may be executed with proper ASPM settings set in the BIOS for each of the peripheral devices.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
an expansion slot;
a peripheral device connected to the expansion slot; and
a processor communicatively coupled to the expansion slot, wherein the processor is to:
determine that a compatibility of the peripheral device with active state power management (ASPM) is unknown;
provide a notification to indicate that the compatibility of the peripheral device with ASPM is unknown, wherein the notification provides a selection between disabling ASPM for the peripheral device or enabling ASPM for the peripheral device; and
configure a basic input/output system (BIOS) setting in accordance with the selection to control the ASPM for the peripheral device.

2. The apparatus of claim 1, wherein the expansion slot comprises a peripheral component interconnect express (PCIe) interface.

3. The apparatus of claim 2, wherein the peripheral device is connected via a PCIe slot or an M.2 slot.

4. The apparatus of claim 1, wherein the peripheral device comprises a network interface card or a discrete graphics card.

5. A method, comprising:
scanning, by a processor, slots of a peripheral component interconnect express (PCIe) interface;
detecting, by the processor, a peripheral device connected to a slot of the PCIe interface;

determining, by the processor, that a compatibility of the peripheral device with active state power management (ASPM) is unknown;

prompting, by the processor, a user to provide an ASPM control selection for the peripheral device; and configuring, by the processor, a basic input/output system (BIOS) setting in accordance with the ASPM control selection.

6. The method of claim 5, wherein the detecting is performed by a platform controller hub (PCH) using a system management bus (SMBus) of the PCIe interface.

7. The method of claim 5, wherein the determining comprises:

comparing, by the processor, the peripheral device to a black list of known peripheral devices that are not compatible with ASPM.

8. The method of claim 5, wherein the determining comprises:

comparing, by the processor, the peripheral device to a white list of known peripheral devices that are compatible with ASPM.

9. The method of claim 5, further comprising:

generating, by the processor, a pop-up warning message to indicate that ASPM controls may create instability with the peripheral device that is connected to the PCIe interface.

10. The method of claim 5, wherein the ASPM control selection comprises force enabling ASPM for the peripheral device.

11. The method of claim 5, wherein the ASPM control selection comprises disabling ASPM for the peripheral device.

12. A non-transitory computer readable storage medium encoded with instructions which, when executed, cause a processor of an apparatus to:

initiate a boot sequence;

detect peripheral devices connected to slots of a peripheral component interconnect express (PCIe) interface;

identify a peripheral device of the peripheral devices that are connected that has an unknown compatibility with active state power management (ASPM);

generate a notification to be displayed to warn a user of the unknown compatibility with ASPM, wherein the notification is to prompt the user for an ASPM control selection for the peripheral device; and control the peripheral device in accordance with the ASPM control selection that is received.

13. The non-transitory computer readable storage medium of claim 12, wherein the peripheral device is identified based on an absence of the peripheral device on a black list of known peripheral devices that are not compatible with ASPM and an absence of the peripheral device on a white list of known peripheral devices that are compatible with ASPM.

14. The non-transitory computer readable storage medium of claim 12, wherein information associated with the peripheral devices that are detected are received from system configuration information provided via a system management bus.

15. The non-transitory computer readable storage medium of claim 12, wherein the ASPM control selection is applied to a slot of the PCIe interface connected to the peripheral device that is identified having the unknown compatibility with ASPM.

* * * * *